(12) United States Patent
Choi

(10) Patent No.: US 8,477,449 B2
(45) Date of Patent: Jul. 2, 2013

(54) BASE FOR MOTOR AND HARD DISK DRIVE INCLUDING THE SAME

(75) Inventor: Tae Young Choi, Gyunggi-do (KR)

(73) Assignee: Samsung Electro-Mechanics Co., Ltd., Suwon (KR)

(*) Notice: Subject to any disclaimer, the term of this patent is extended or adjusted under 35 U.S.C. 154(b) by 0 days.

(21) Appl. No.: 13/348,125

(22) Filed: Jan. 11, 2012

(65) Prior Publication Data

US 2013/0114160 A1 May 9, 2013

(30) Foreign Application Priority Data

Nov. 3, 2011 (KR) ........................ 10-2011-0113680

(51) Int. Cl.
*G11B 17/34* (2006.01)

(52) U.S. Cl.
USPC ...................................... 360/97.11

(58) Field of Classification Search
USPC .......... 360/97.11, 97.12, 97.13, 97.14, 97.15, 360/97.16, 97.2, 97.21, 264.2, 246.1, 265.5
See application file for complete search history.

(56) References Cited

U.S. PATENT DOCUMENTS

| | | | | |
|---|---|---|---|---|
| 6,525,931 | B2 * | 2/2003 | Yagenji et al. | 361/679.33 |
| 6,816,337 | B1 * | 11/2004 | Mukaijima et al. | 360/99.18 |
| 6,922,836 | B2 * | 7/2005 | Watanabe | 720/601 |
| 7,295,399 | B2 * | 11/2007 | Konno et al. | 360/99.02 |
| 7,379,274 | B2 * | 5/2008 | Yao et al. | 360/294.4 |
| 7,420,774 | B2 * | 9/2008 | Sievers et al. | 360/97.11 |
| 7,486,509 | B2 * | 2/2009 | Kim et al. | 361/679.34 |
| 8,031,431 | B1 * | 10/2011 | Berding et al. | 360/99.18 |
| 2012/0275105 | A1 * | 11/2012 | Mcguire, Jr. | 361/679.33 |

FOREIGN PATENT DOCUMENTS

JP 2000-298929 10/2000

* cited by examiner

*Primary Examiner* — Allen T Cao

(57) ABSTRACT

There is provided a base for a motor, the base including: a base body formed by performing press processing on a steel plate, a base material; an outer wall part defining an outer edge of the base body and formed by being bent from an end portion of the base body; and at least one weight reducing part formed by removing a predetermined region of the outer wall part.

6 Claims, 5 Drawing Sheets

BASE FOR MOTOR AND HARD DISK DRIVE INCLUDING THE SAME

CROSS-REFERENCE TO RELATED APPLICATIONS

This application claims the priority of Korean Patent Application No. 10-2011-0113680 filed on Nov. 3, 2011, in the Korean Intellectual Property Office, the disclosure of which is incorporated herein by reference.

BACKGROUND OF THE INVENTION

1. Field of the Invention

The present invention relates to a base for a motor and a hard disk drive including the same, and more particularly, to a base for a motor manufactured by press processing and having significantly reduced weight while securing rigidity, and a hard disk drive including the same.

2. Description of the Related Art

A hard disk drive (HDD), a computer information storage device, reads data stored on a disk or writes data to the disk using a magnetic head.

In a hard disk drive, a base has a head driver installed thereon, that is, a head stack assembly (HSA), capable of altering a position of the magnetic head relative to the disk. The magnetic head performs its function while moving to a desired position in a state in which it is suspended above a writing surface of the disk by the head driver at a predetermined height.

According to the related art, in manufacturing a base provided in a hard disk drive, a post-processing scheme of die-casting aluminum (Al) and then removing burrs or the like, generated due to the die-casting, has been used.

However, in the die-casting scheme according to the related art, since a process of injecting molten aluminum (Al) for casting a base is performed, high temperatures and pressure are required, such that a large amount of energy is required in the process and a process time may be increased.

Further, in terms of a die-casting mold lifespan, there is a limitation in manufacturing a large number of bases using a single mold, and a base manufactured by the die-casting process may have poor dimensional precision.

Therefore, in order to solve defects of the die-casting process, the base has been manufactured using a pressing method. However, in the case of the pressing method, based rigidity may be degraded due to the characteristics of a process of bending and cutting a plate.

Therefore, in order to secure the rigidity, a thickness of the plate can only be increased. However, in this case, base weight may be increased inappropriately in terms of miniaturization and thinness.

Accordingly, research into a technology of securing base rigidity simultaneously with significantly reducing weight thereof in manufacturing the base by a pressing process to thereby improve performance and a base lifespan has been urgently demanded.

SUMMARY OF THE INVENTION

An aspect of the present invention provides a base for a motor having reduced weight and improved rigidity, even in the case of being manufactured by press processing, and a hard disk drive including the same.

According to an aspect of the present invention, there is provided a base for a motor, the base including: a base body formed by performing press processing on a steel plate, a base material; an outer wall part defining an outer edge of the base body and formed by being bent from an end portion of the base body; and at least one weight reducing part formed by removing a predetermined region of the outer wall part.

The outer wall part may include an inner side wall part formed by being bent from the end portion of the base body, an upper wall part formed by being bent from an end portion of the inner side wall part, and an outer side wall part formed by being bent from an end portion of the upper wall part.

The weight reducing part may be formed in the outer side wall part.

An upper surface of the upper wall part may be a flat surface so that a sealing part for sealing from the outside is disposed thereon.

The upper surface of the upper wall part may be provided in parallel with an upper surface of the base body.

An edge of the upper surface of the upper wall part may have a radius of curvature.

According to another aspect of the present invention, there is provided a hard disk drive including: the base for a motor as described above; a spindle motor coupled to the base for a motor and rotating a disk; and a head driver moving a magnetic head to a predetermined position on the disk, wherein the magnetic head writes data on the disk and reproduces the data stored on the disk.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE INVENTION

Figure 1:
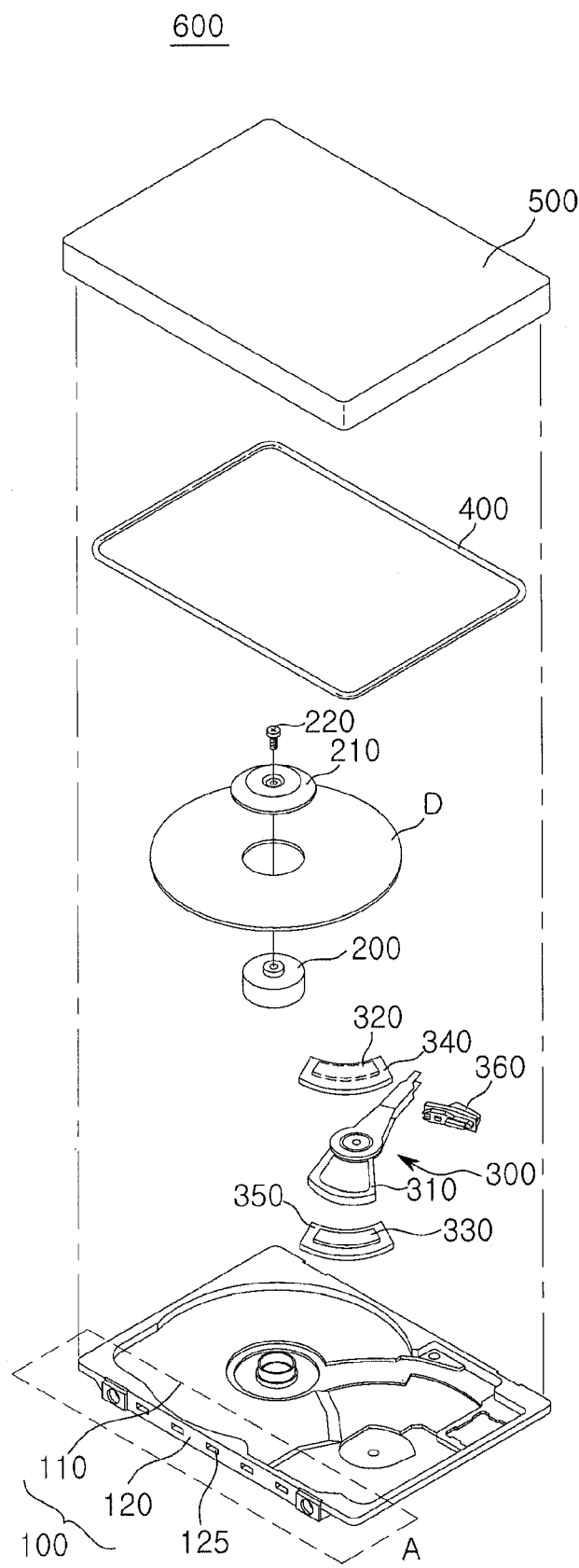
FIG. 1 is a schematic exploded perspective view showing a hard disk drive including a base for a motor according to an embodiment of the present invention.

Embodiments of the present invention will now be described in detail with reference to the accompanying drawings. However, it should be noted that the spirit of the present invention is not limited to the embodiments set forth herein and those skilled in the art and understanding the present invention can easily accomplish retrogressive inventions or other embodiments included in the spirit of the present invention by the addition, modification, and removal of components within the same spirit, but those are construed as being included in the spirit of the present invention.

Further, like reference numerals will be used to designate like components having similar functions throughout the drawings within the scope of the present invention.

Figure 2:
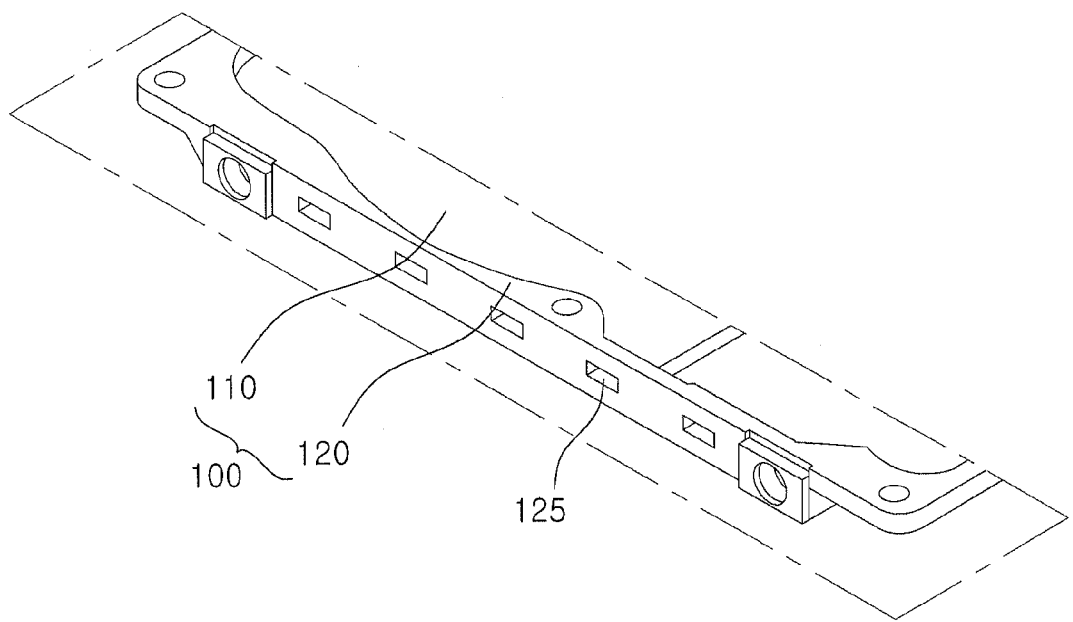
FIG. 2 is a schematic cut-away perspective view showing the hard disk drive including the base for a motor according to the embodiment of the present invention but omitting a sealing part.
Figure 3:
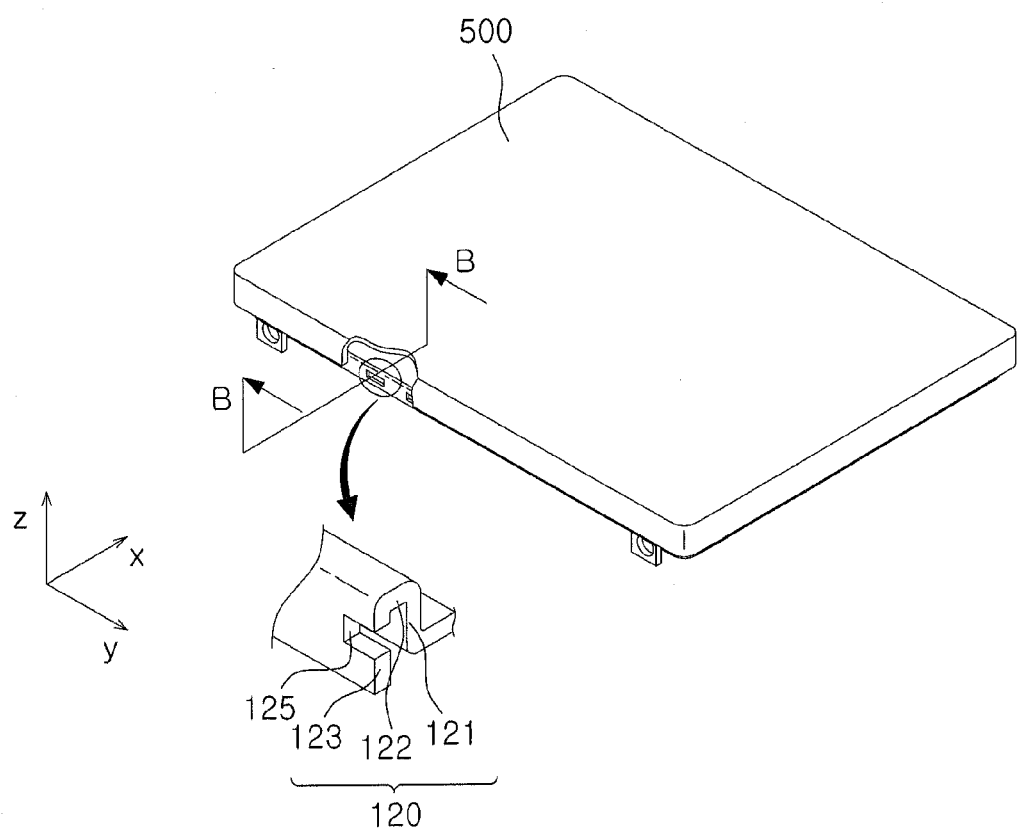
FIG. 3 is a schematic cross-sectional view taken along line B-B of FIG. 2.
Figure 4:
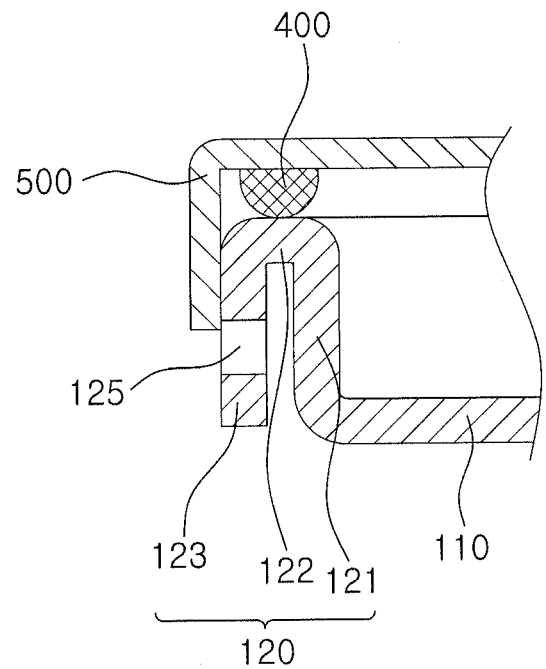
FIG. 4 is a schematic enlarged view of part A of FIG. 1.

FIG. 1 is a schematic exploded perspective view showing a hard disk drive including a base for a motor according to an embodiment of the present invention; FIG. 2 is a schematic cut-away perspective view showing the hard disk drive including the base for a motor according to the embodiment of the present invention but omitting a sealing part; FIG. 3 is a schematic cross-sectional view taken along line B-B of FIG. 2; and FIG. 4 is a schematic enlarged view of part A of FIG. 1.

Referring to FIGS. 1 through 4, a hard disk drive 600 including the base 100 for a motor (hereinafter, referred to as a "base") according to the embodiment of the present invention may include the base 100, a spindle motor 200 disposed in an internal space of the base 100, and a head driver 300.

The base 100 may be a housing forming an appearance together with a cover 500 in the hard disk drive 600 according to the embodiment of the present invention and include a base body 110, an outer wall part 120, and a weight reducing part 125 formed in the outer wall part 120.

Here, a basic shape of the base 100 such as the base body 110 and the outer wall part 120 may be manufactured by press processing and a final shape of the base 100 may be then manufactured by bending or cutting processing, additional processing.

That is, the base 100 according to the embodiment of the present invention may be manufactured by performing a single process by the press processing or the additional processing on a cold rolled steel sheet (SPCC, SPCE, or the like) or a hot rolled steel sheet, unlike the post-processing scheme according to the related art in which aluminum (Al) is die-cast and a burr, or the like, generated due to the die-casting is then removed.

Therefore, since the base 100 according to the embodiment of the present invention may be manufactured by the press processing, a process time and energy consumption may be significantly reduced, whereby production capability may be improved.

Here, the base body 110 may form an internal space of the base 100 therein, wherein the internal space indicates a space in which a spindle motor 200 and a head driver 300 to be described below are disposed.

The outer wall part 120 indicates an outer wall of the base 100. More specifically, the outer wall part may define an outer edge of the base body 110.

That is, the outer wall part 120 may be formed by being bent from an end portion of the base body 110 and include an inner side wall part 121, an upper wall part 122, and an outer side wall part 123.

The inner side wall part 121 of the outer wall part 120 may be formed by being bent from the end portion of the base body 110 upwardly in an axial direction, and the outer side wall part 123 may be formed by again being bent downwardly in the axial direction at a predetermined height of the inner side wall part 121.

Here, the inner side wall part 121, the upper wall part 122, and the outer side wall part 123 as described above may be basic components configuring the outer wall part 120 due to characteristics of the press processing in which the base can only basically have a uniform thickness.

That is, in the case in which the base 100 is manufactured by disposing a steel plate, a base material, that is, a cold rolled steel sheet (SPCC, SPCE, or the like) or a hot rolled steel sheet in a press mold and pressing the plate shaped steel at a predetermined pressure as in the base 100 according to the embodiment of the present invention, the base can not but basically have a uniform thickness.

Therefore, a bending process may be required in order to form the outer wall part 120 of the base 100. Accordingly, the inner side wall part 121, the upper wall part 122, and the outer side wall part 123 are formed.

Here, the upper wall part 122, a connection part between the inner side wall part 121 and the outer side wall part 123, may be a part at which a sealing part 400 sealing the internal space of the base 100 is disposed and have a flat surface for increasing a contact area with the sealing part 400 in order to significantly increase a sealing function.

Here, the upper wall part 122 may be provided in parallel with an upper surface of the base body 110 due to the flat surface. Since the upper wall part 122 is formed by the bending process, an edge of the upper wall part 122 may have a predetermined radius of curvature.

Meanwhile, since the outer side wall part 123 of the outer wall part 120 is a part coupled to the cover 500, it needs to have rigidity larger than that of the inner side wall part 121 or the upper wall part 122 in order to increase coupling strength and be coupled to a coupling unit.

Therefore, a length of the outer side wall part 123 in a z-axis direction needs to be as long as possible. As a result, the rigidity of the outer wall part 120 may be secured.

However, as the length of the outer side wall part 123 in the z-axis direction increases, weight of the base 100 also increases.

Since this is opposite to the current trend toward miniaturization and thinness of the hard disk drive 600 for a mobile, a trade-off between the rigidity and the weight is required.

Here, the base 100 according to the embodiment of the present invention may include at least one weight reducing part 125 formed in the outer wall part 120 in order to reduce the weight simultaneously with securing the rigidity.

The weight reducing part 125 may be formed by removing a predetermined region of the outer side wall part 123 of the outer wall part 120 and eventually indicates a space formed in the outer side wall part 123.

Here, the weight reducing part 125 may have a rectangular cross section in the axial direction as shown in FIGS. 1 through 4, but is not limited thereto. That is, the weight reducing part 125 may also have a circular, oval, or polygonal cross section.

In addition, a width of the weight reducing part 125 in a y-axis is also not fixed, but may be easily changed in consideration of the rigidity and the weight of the base 100.

Further, the weight reducing part 125 may be formed in any outer wall part 120 defining an outer edge of the base body 110.

Therefore, the base 100 according to the embodiment of the present invention may be formed so that the outer side wall part 123 of the outer wall part 120 has a long length in the z-axis direction, whereby the base 100 may have weight reduced by weight corresponding to a predetermined region of the outer side wall part 123 removed in order to form the weight reducing part 125, simultaneously with securing the rigidity.

The spindle motor 200, to rotate the disk D, may be fixedly mounted at a central portion of the base body 110 in a y-axis direction.

The disk D, coupled to the spindle motor 200 to thereby rotate together with the spindle motor 200, may have a writing surface on which data is written.

Here, the spindle motor 200 may include a clamp 210 coupled to an upper end portion thereof by a screw 220 in order to firmly fix the disk ID thereto.

In addition, although FIG. 1 shows a configuration in which a single disk ID is mounted on the spindle motor 200, this configuration is only an example. That is, one or more disk D may be mounted on the spindle motor 200.

In a case in which a plurality of disks D are mounted as described above, a ring shaped spacer for maintaining an interval between the disks D may be disposed between the disks D.

The head driver 300 is called a head stack assembly (HAS) and may be a component having a magnetic head mounted thereon and moving the magnetic head to a predetermined position to thereby write the data on the disk D or read the data stored on the disk D.

In addition, the head driver 300 may move the magnetic head to a predetermined position of the disk D by a voice coil motor (VCM) including a coil 310 and upper and lower magnets 320 and 330.

Here, the upper and lower magnets 320 and 330 respectively disposed on upper and lower portions of the coil 310 provided in the VCM may be coupled to upper and lower yokes 340 and 350, respectively, in order to increase magnetic flux density and be fixed to the base 100.

The VCM may be controlled by a servo control system and rotate the head driver 300 based on a pivot axis in a direction according to the Fleming's left hand rule by interaction between a current input by the coil 310 provided in the VCM and magnetic fluxes formed by the upper and lower magnets 320 and 330.

Here, when an operation start command is input to the hard disk drive 600 according to the embodiment of the present invention, the disk D starts to rotate, and the VCM rotates a swing arm in a counterclockwise direction and moves the magnetic head onto a writing surface of the disk D.

On the other hand, when an operation stop command is input to the hard disk drive 600 according to the embodiment of the present invention, the VCM rotates the swing arm in a clockwise direction to thereby allow the magnetic head to deviate from the disk D.

The magnetic head deviating from the writing surface of the disk D is parked in a ramp 360 provided outside the disk D.

Here, the ramp 360 may space the magnetic head from the disk D in the case in which the magnetic head moves to the disk D, simultaneously with parking the magnetic head, whereby the data of the disk D may be stably read.

Figure 5A:
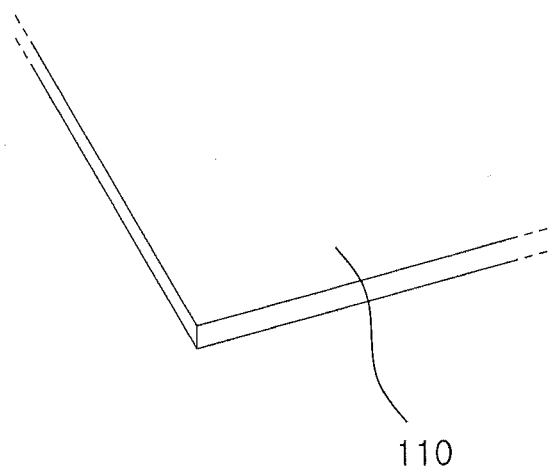
FIGS. 5A through 5C are schematic perspective views showing a process of manufacturing a base for a motor according to the embodiment of the present invention.
Figure 5B:
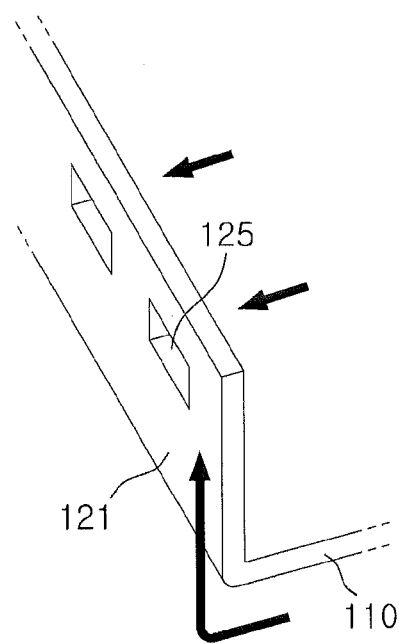
Figure 5C:
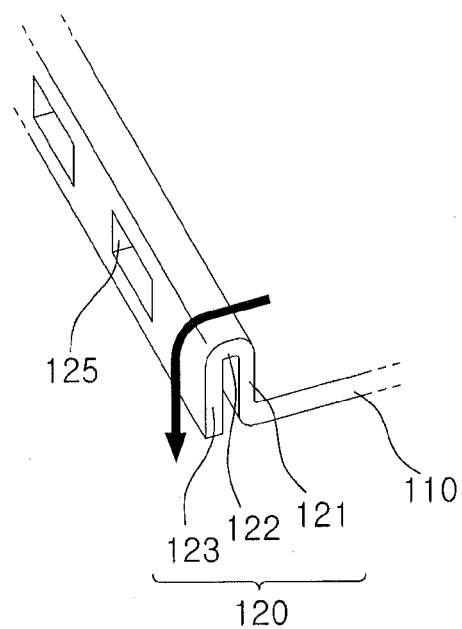

FIGS. 5A through 5C are schematic perspective views showing a process of manufacturing a base for a motor according to the embodiment of the present invention.

In FIGS. 5A through 5C, which are views describing a process of manufacturing the outer wall part 120 of the base 100, a specific feature of the base 100 is omitted.

A basic shape of the base 100 according to the embodiment of the present invention including the base body 110 may be manufactured by performing the press processing on the steel plate, which is the base material (See FIG. 5A).

Then, in order to form the outer wall part 120, the inner side wall part 121 may be formed by being bent from the end portion of the base body 110 upwardly in the axial direction, and a predetermined region may be removed for forming the weight reducing part 125 in the outer side wall part 123 (See FIG. 5B).

At this time, the weight reducing part 125 may have a cross-sectional shape in the axial direction determined according to a shape of the removed region and have various shapes in consideration of the rigidity and the weight of the base 100.

Thereafter, the upper wall part 122 and the outer side wall part 123 may be formed, by again bending a portion formed by being bent from the end portion of the base body 110, downwardly in the axial direction (See FIG. 5C).

Therefore, the outer side wall part 123 formed by the bending process may be provided with at least one weight reducing part 125 formed by removing a predetermined region.

Although the embodiment of the present invention has described that the removing process for forming the weight reducing part 125 is performed after the bending process for forming the inner side wall part 121 is performed as shown in FIG. 5B, the present invention is not limited thereto. That is, the bending process may also be performed after the removing process is performed.

In addition, the weight reducing part 125 may also be formed by removing a predetermined region of the outer side wall part 123 after the inner side wall part 121, the upper wall part 122, and the outer side wall part 123 are formed by performing the bending process twice.

As set forth above, with the base for a motor and the hard disk drive including the same according to the embodiments of the present invention, the base may have improved rigidity simultaneously with having relatively reduced weight even in the case of using the press processing.

Further, the base for a motor may be manufactured by the press processing to significantly reduce a process time and energy consumption, whereby the production capability may be improved.

While the present invention has been shown and described in connection with the embodiments, it will be apparent to those skilled in the art that modifications and variations can be made without departing from the spirit and scope of the invention as defined by the appended claims.

What is claimed is:

1. A base for a motor, the base comprising:
   a base body formed by performing press processing on a steel plate, a base material;
   an outer wall part defining an outer edge of the base body and formed by being bent from an end portion of the base body, the outer wall part including
      an inner side wall part formed by being bent from the end portion of the base body,
      an upper wall part formed by being bent from an end portion of the inner side wall part, and
      an outer side wall part formed by being bent from an end portion of the upper wall part; and
   at least one weight reducing part formed by removing a predetermined region of the outer wall part.

2. The base of claim 1, wherein the weight reducing part is formed in the outer side wall part.

3. The base of claim 1, wherein an upper surface of the upper wall part is a flat surface so that a sealing part for sealing from the outside is disposed thereon.

4. The base claim 1, wherein the upper surface of the upper wall part is provided in parallel with an upper surface of the base body.

5. The base of claim 1, wherein an edge of the upper surface of the upper wall part has a radius of curvature.

6. A hard disk drive comprising:
   the base for a motor of claim 1;
   a spindle motor coupled to the base for a motor and rotating a disk; and
   a head driver moving a magnetic head to a predetermined position on the disk, the magnetic head writing data on the disk and reproducing the data stored on the disk.

* * * * *

UNITED STATES PATENT AND TRADEMARK OFFICE
CERTIFICATE OF CORRECTION

PATENT NO. : 8,477,449 B2
APPLICATION NO. : 13/348125
DATED : July 2, 2013
INVENTOR(S) : Choi Page 1 of 1

It is certified that error appears in the above-identified patent and that said Letters Patent is hereby corrected as shown below:

In the Claims:

Column 6, Line 50, In Claim 4, delete "base claim 1," and insert -- base of claim 1, --, therefor.

Signed and Sealed this
Fifteenth Day of October, 2013

Teresa Stanek Rea
*Deputy Director of the United States Patent and Trademark Office*